(12) United States Patent
Cheatham, III et al.

(10) Patent No.: US 9,514,653 B2
(45) Date of Patent: Dec. 6, 2016

(54) SYSTEMS, METHODS, AND DEVICES FOR PROVIDING ASSISTANCE TO AN UNMANNED AERIAL VEHICLE

(71) Applicant: Elwha LLC, Bellevue, WA (US)

(72) Inventors: Jesse R. Cheatham, III, Seattle, WA (US); Hon Wah Chin, Palo Alto, CA (US); William David Duncan, Mill Creek, WA (US); Roderick A. Hyde, Redmond, WA (US); Muriel Y. Ishikawa, Livermore, CA (US); Jordin T. Kare, San Jose, CA (US); Tony S. Pan, Bellevue, WA (US); Robert C. Petroski, Seattle, WA (US); Clarence T. Tegreene, Mercer Island, WA (US); David B. Tuckerman, Lafayette, CA (US); Yaroslav A. Urzhumov, Bellevue, WA (US); Thomas Allan Weaver, San Mateo, CA (US); Lowell L. Wood, Jr., Bellevue, WA (US); Victoria Y. H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 14/682,987

(22) Filed: Apr. 9, 2015

(65) Prior Publication Data

US 2016/0300496 A1    Oct. 13, 2016

(51) Int. Cl.
| | | |
|---|---|---|
| *G01C 23/00* | (2006.01) | |
| *G08G 5/00* | (2006.01) | |
| *B64C 39/02* | (2006.01) | |
| *B64D 47/08* | (2006.01) | |

(52) U.S. Cl.
CPC ........... *G08G 5/0069* (2013.01); *B64C 39/024* (2013.01); *B64D 47/08* (2013.01); *G08G 5/0078* (2013.01); *B64C 2201/024* (2013.01); *B64C 2201/127* (2013.01)

(58) Field of Classification Search
CPC ..... G08G 5/0069; G08G 5/025; G08G 5/045
USPC ............... 701/2, 3, 11, 13, 14, 16, 120, 467; 340/947; 244/75.1
See application file for complete search history.

(56) References Cited

U.S. PATENT DOCUMENTS

| | | | |
|---|---|---|---|
| 8,199,643 B2 | 6/2012 | Hirsch et al. | |
| 9,195,938 B1* | 11/2015 | Bonawitz | ................ G06N 5/02 |
| 2006/0249622 A1 | 11/2006 | Steele | |
| 2010/0182969 A1 | 7/2010 | Hirsch et al. | |
| 2011/0006151 A1 | 1/2011 | Beard | |
| 2012/0080556 A1* | 4/2012 | Root, Jr. | ................... B64F 1/02 244/63 |
| 2014/0025228 A1 | 1/2014 | Jang et al. | |
| 2015/0142211 A1* | 5/2015 | Shehata | ................ H04N 7/181 701/2 |
| 2016/0068265 A1 | 3/2016 | Hoareau et al. | |
| 2016/0068268 A1* | 3/2016 | Bookless | ............... G06Q 10/20 701/3 |

* cited by examiner

*Primary Examiner* — Gertrude Arthur Jeanglaud (57) ABSTRACT

A service unmanned aerial vehicle (UAV) includes a flight system, a status component, a navigation system, and a surveillance component. The flight system is for flying the service UAV. The status component is configured to determine that a first UAV is disabled. The navigation system is configured to fly the service UAV to a landing location of the first UAV in response to the status component determining that the first UAV is disabled. The surveillance component is configured to observe the first UAV and an area surrounding the first UAV.

35 Claims, 7 Drawing Sheets

SYSTEMS, METHODS, AND DEVICES FOR PROVIDING ASSISTANCE TO AN UNMANNED AERIAL VEHICLE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None.

RELATED APPLICATIONS

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Unmanned aerial vehicles (UAVs) are fully autonomous, partially autonomous, or fully human-controlled aerial vehicles that do not have a cockpit for a human pilot, or that do not require the onboard presence of a human pilot. For example, UAVs may require a skilled pilot who remotely controls all aspects of operation using a computer or other controller. Similarly, other UAVs may be partially or fully automated such that only some, little, or no human intervention is required. UAVs may also be referred to as remote-controlled aerial vehicles, drones, or other terms. UAVs come in a variety of form factors, including airplanes, gliders, helicopters, or any other type of aerial vehicle. Helicopter type vehicles may include one or more rotors; for example, a quadropter has four rotors.

Because no human pilot is required onboard a UAV, the UAV can be smaller in size and eliminate at least some complexity that may generally be used to provide for human comfort or safety. This can lead to reduced cost, reduced risk of injury to pilots, the ability to perform automated tasks, and many other benefits. Because of these and other benefits, it is anticipated that UAVs will experience high levels of growth for hobby, military, and commercial purposes. However, the increased use of UAVs may lead to greater risk of damaging the property of others, such as by crashing or causing fires. Furthermore, UAVs may carry valuable payload or may represent a significant loss if recovered by a competitor or a looter.

Based on the foregoing, Applicants have recognized a need for providing assistance to disabled or downed UAVs to reduce potential loss or damage. According to one embodiment, a service UAV includes a flight system, a status component, a navigation system, and a surveillance component. The flight system is for flying the service UAV and may include one or more engines, motors, wings, rotors, propellers, and/or the like. The status component is configured to determine that a first UAV is disabled. The navigation system is configured to cause the service UAV to fly to a landing location of the first UAV in response to the status component determining that the first UAV is disabled. The surveillance component is configured to observe the first UAV and an area surrounding the first UAV. According to another embodiment, a service UAV includes a flight system, a status component, a navigation system, and a harm prevention component. The harm prevention component is configured to place the first UAV in a damage prevention condition to prevent heat or fire damage to one or more of the first UAV and objects in an area near the first UAV.

By way of example, sometimes a UAV may need to make an emergency landing or crash. For example, the UAV may run out of fuel or power, have a malfunction, or experience some other failure or disablement. According to one embodiment, a service UAV (rather than a land vehicle or human-operated aerial vehicle) may be dispatched to take care of the downed UAV. In one embodiment, the service UAV brings fuel, filling either by liquid transfer, by recharging, or by whole-tank or battery transfer. In one embodiment, the service UAV recharges the downed UAV's batteries. In the case of a nonfunctioning UAV, the service UAV may simply pick it up and fly it to a safe location or the owner, or it may rescue the UAV's payload. The service UAV may fly over a coverage region, ready for quick response. Or, the service UAV may roost somewhere and fly in upon need. In some cases, a flight-stationed service UAV may respond fast enough to catch the needy UAV in a net before it lands, or the needy UAV may be able to prolong its flight long enough for this to happen. In some cases, the service UAV may simply hover overhead of a downed UAV and protect its payload from looting. The services of a service UAV may be provided by a business, with which other UAV owners contract.

Figure 1:
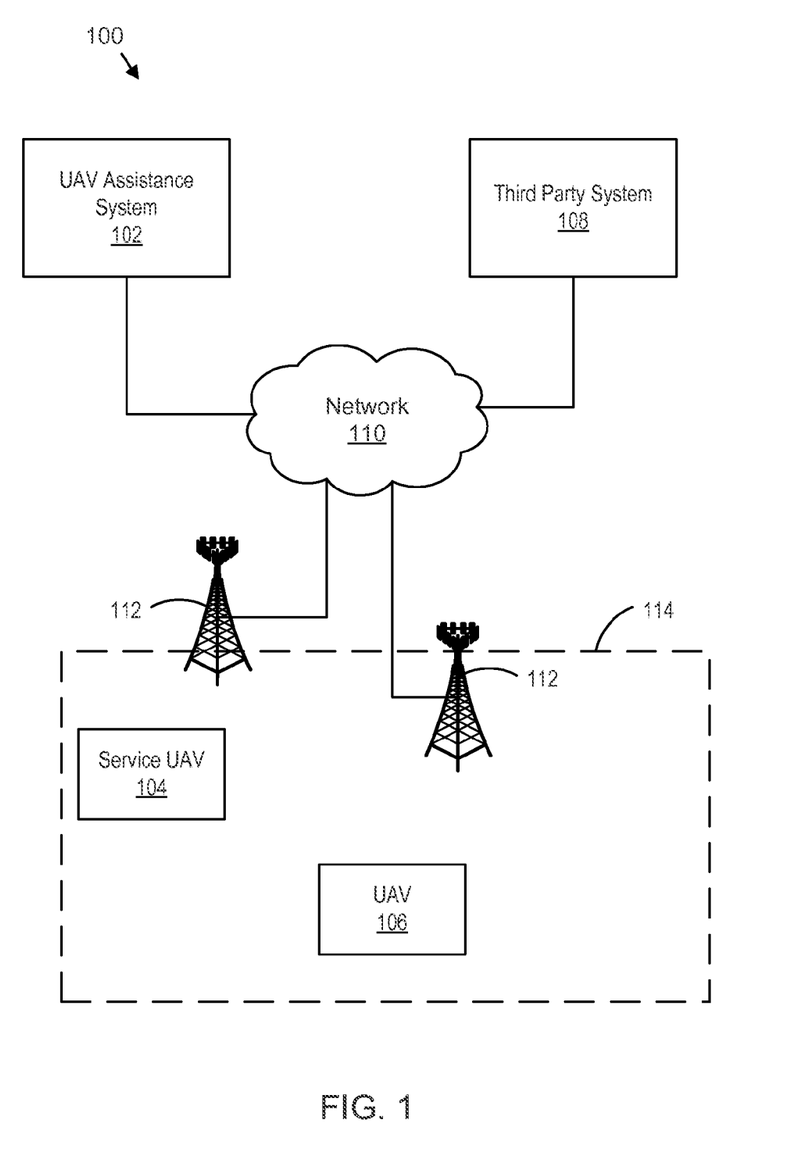
FIG. 1 is a schematic block diagram of a system for providing assistance to one or more disabled unmanned aerial vehicles (UAVs), consistent with embodiments disclosed herein.

FIG. 1 is a schematic block diagram illustrating one embodiment of a system 100 for providing assistance to a UAV 106. The system 100 includes a UAV assistance system 102, a service UAV 104, and a third party system 108. The UAV assistance system 102, service UAV 104, UAV 106, and third party system 108 may communicate with each other directly (e.g., via radio) or may communicate with each other via a network 110. In one embodiment, since the service UAV 104 and UAV 106 are mobile, the service UAV 104 and UAV 106 may communicate with each other and/or the UAV assistance system 102 and third party system 108 via base stations 112. The base stations 112 may include nodes and/or network controllers for any type of wireless communication network such as a wide area network (WAN) cellular network, or wireless local area network (WLAN). In one embodiment, the service UAV 104 and UAV 106 may be able to communicate directly with each other using a wireless communication standard such as WiFi, Bluetooth, or the like. For example, the service UAV 104 may relay messages to the network 110 for the UAV 106.

In one embodiment, the UAV assistance system 102 monitors a status of the UAV 106 and/or the service UAV 104. The UAV assistance system 102 may include a computing device such as a server, workstation, or the like. The UAV assistance system 102 may determine that the UAV 106 needs assistance and dispatch the service UAV 104 to provide that assistance. In some embodiments, a plurality of service UAVs and served UAVs may be monitored. The service UAV 104 may respond to messages from the UAV assistance system 102 to provide any services needed by the UAV 106. For example, the service UAV 104 may fly to a location of the UAV 106 and provide a service indicated by the UAV assistance system 102, indicated by the UAV 106, or autonomously determined by the service UAV 104. In one embodiment, the service UAV 104 may be available to provide assistance to UAVs within a specific geographical area 114. The UAV 106 may include a UAV that has subscribed to services of the UAV assistance system 102. The UAV 106 may include a hobby, military, or commercial UAV. For example, the UAV 106 may be used for surveillance, package delivery, communication services, or any other use. In one embodiment, the UAV 106 is another service UAV. The third party system 108 may be a system that provides authorization for assistance to the UAV 106, receives billing information, or receives other information about the UAV 106 that may be forwarded to an owner or operator of the UAV.

Figure 2:
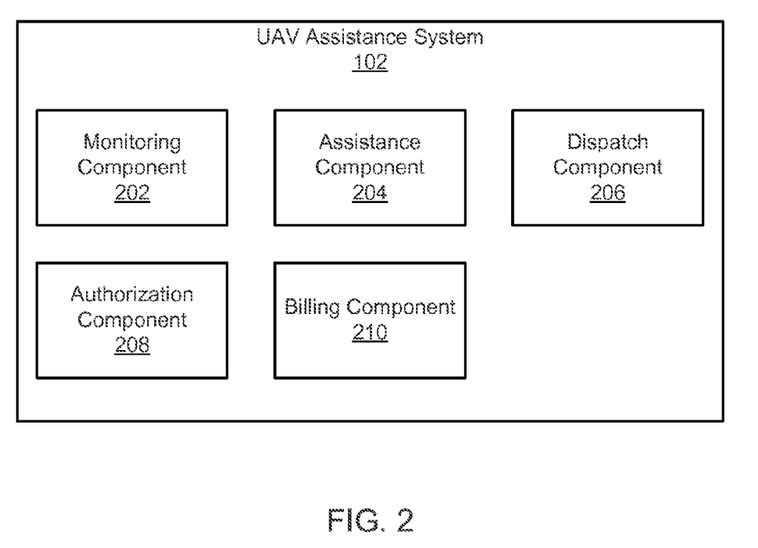
FIG. 2 is a schematic block diagram of a UAV assistance system, consistent with embodiments disclosed herein.

FIG. 2 is a schematic block diagram illustrating components of the UAV assistance system 102, according to one embodiment. The UAV assistance system 102 includes a monitoring component 202, an assistance component 204, a dispatch component 206, an authorization component 208, and a billing component 210. The components 202-210 are given by way of example only. Some embodiments may include only one or any combination of two or more of the components 202-210, without limitation.

The monitoring component 202 determines whether one or more UAVs are disabled. In one embodiment, the monitoring component 202 may monitor a status of one or more UAVs that subscribe to an assistance service. In one embodiment, the monitoring component 202 may receive an indication that a specific UAV is disabled. For example, a UAV may send a wireless help request or an indication of a disabled status to the UAV assistance system 102, third party system 108, or other device or system. In one embodiment, the UAV may explicitly report that it has landed or will be landing unexpectedly. In one embodiment, the UAV may have onboard sensors that report its position, engine status, speed, etc., and the fact that the UAV is disabled may be determined by the monitoring component 202 or other system.

The monitoring component 202 may receive the indication that the UAV is disabled after the indication has been routed through a network 110 and/or through a third party system 108. In one embodiment, an indication that the UAV is disabled may be received from a remote sensor monitoring the UAV or based on a determination made by the remote sensor or data gathered by the remote sensor. For example, the remote sensor may be a camera or radar system that is located on a service UAV 104 or within a coverage area 114 monitored by the remote sensor.

In one embodiment, the indication that the UAV is disabled, or is otherwise experiencing partial or complete failure, may be in response to the UAV making an unplanned landing or determining that a previously unplanned landing must be made due to a problem with the operation of the UAV. In one embodiment, the indication that the UAV is disabled may include a message that also indicates a type of assistance desired by the UAV. For example, the type of assistance may include recovering a package, receiving the UAV or a portion of the UAV, providing surveillance for the UAV, or any other type of assistance. In one embodiment, the message may include an indication of a time by which assistance is desired by the UAV. For example, the UAV may have a time-sensitive objective to perform or may simply indicate that a system that can provide the assistance within the time period will be allowed to provide the assistance.

The assistance component 204 may determine that a UAV requires assistance and/or a type of assistance that is required. For example, the assistance component 204 may determine that assistance is needed in response to the monitoring component 202 determining that a UAV is disabled. The assistance component 204 may determine or identify a service UAV 104 that is available for assisting the disabled UAV.

In one embodiment, the assistance component 204 may determine whether a specific service UAV 104 is capable of providing needed assistance. For example, the assistance component 204 may determine whether a specific UAV 104 is close enough to provide assistance in a required time period or within a specific geographical area 114. Similarly, the assistance component 204 may determine whether a service UAV 104 is capable of carrying the downed UAV, a payload of the downed UAV, or a portion of the downed UAV. The assistance required may be based on a message or indication received, processed, or decoded by the monitoring component 202. The assistance component 204 may determine whether the service UAV 104 can put out a fire, provide surveillance, or provide any other service. If the service UAV 104 is capable of providing the service, the assistance component 204 may identify or select the service UAV 104 as the service UAV 104 to provide the assistance.

The dispatch component 206 is configured to dispatch a service UAV 104 to provide assistance to a disabled UAV, such as UAV 106 of FIG. 1. In one embodiment, the dispatch component 206 transmits, or prepares and causes the UAV assistance system 102 to transmit, a message dispatching a service UAV 104 to provide assistance to a disabled UAV. For example, the service UAV 104 may receive the message and then provide assistance to the disabled UAV. In one embodiment, the dispatch component 206 may additionally prepare or transmit a message reporting the dispatch of the service UAV 104 to one or more of an owner of the disabled UAV (or corresponding device or system), an operator of the disabled UAV (or corresponding device or system), or the disabled UAV itself. The message reporting the dispatch may include an estimated arrival time, service completion time, cost, or the like.

In one embodiment, the dispatch component 206 may send a plurality of messages to the service UAV 104 to provide updates or other information as it becomes known. For example, the service UAV 104 may be dispatched to an area as soon as a UAV reports trouble, and the service UAV 104 can be directed to a precise location once the disabled UAV lands or it is known where the disabled UAV will land. In one embodiment, the message dispatching the service UAV 104 may include a predicted landing location for the disabled UAV. For example, the service UAV 104 may begin to flow toward the predicted location as soon as it is known. This may allow the service UAV 104 to be dispatched earlier. The service UAV 104 may, when it gets closer, directly locate the disabled UAV autonomously (e.g., via visual identification, direct radio communication with the disabled UAV, or the like). In one embodiment, the dispatch component 206 may send an additional message indicating an actual landing location of the disabled UAV. In one embodiment, the first message sent by the dispatch component 206 may include the actual landing location for the disabled UAV.

In one embodiment, the dispatch component 206 may provide an indication of service to be provided to the disabled UAV. Example services may include replenishing or replacing an energy storage component (such as a battery or fuel tank), recovering a payload, recovering a portion of the disabled UAV, putting out a fire, discharging a battery, removing fuel, placing markers, providing surveillance to avoid looting or theft, sanitizing, moving the UAV, or any other assistance or service disclosed herein. In one embodiment, the service UAV 104 may determine what is needed once the service UAV 104 arrives on scene by observing the disabled UAV and/or communicating with a short range wireless communication standard to acquire information about the state of the UAV.

The authorization component 208 is configured to determine whether the UAV assistance system 102 or a service UAV 104 is authorized to provide assistance to a disabled UAV. In one embodiment, the authorization component 208 determines whether a disabled UAV, or an owner or operator of the disabled UAV, has a corresponding active subscription account. For example, the authorization component 208 may compare an identifier received in a message indicating that the UAV is disabled with a list of subscribed UAVs or accounts. In one embodiment, the authorization component 208 may determine that there is a contract to provide services to the disabled UAV.

In one embodiment, the authorization component 208 may authorize providing assistance to a UAV in response to receiving a message from the UAV, a third party system 108, or the like indicating that an owner or operator approves the assistance. For example, the authorization component 208 may authorize assistance on a per-occurrence basis. In one embodiment, a message indicating that the providing of assistance is approved may include an indication that payment has been received or will be provided. In one embodiment, the authorization component 208 receives an indication authorizing the UAV assistance system 102 to dispatch a service UAV 104 to provide assistance to the disabled UAV. Authorization may be exclusive or specific to a specific UAV or may be applicable to all UAVs of a specific owner or operator.

In one embodiment, the authorization component 208 may receive an indication that deauthorizes the UAV assistance system 102 from providing service to the disabled UAV. For example, the indication may include a message with an explicit indication to stay away. Or, the indication that assistance is not authorized may be implicit. For example, the message may indicate that a different service has been authorized. In one embodiment, the authorization component 208 will only allow the dispatch component 206 to dispatch the service UAV 104 if there is authorization. Similarly, if a service UAV 104 has been dispatched, the dispatch component 206 may send a message stopping or recalling the service UAV 104 from providing the assistance.

The billing component 210 is configured to request, log, or obtain payment for assistance provided to a disabled UAV. In one embodiment, the billing component 210 receives or processes an indication of a payment amount authorized in exchange for dispatching the service UAV 104 to provide assistance to the disabled UAV. For example, the billing component 210 may determine that the payment amount is sufficient to provide an indicated or requested service to the disabled UAV. In one embodiment, the billing component 210 transmits a message to one or more of the disabled UAV, an owner of the disabled UAV, and an operator of the disabled UAV reporting a service charge to be assessed in exchange for dispatching the service UAV 104 to provide assistance to the disabled UAV. In one embodiment, the billing component 210 may log an incident for billing or tracking assistance to an active subscription account.

Figure 3:
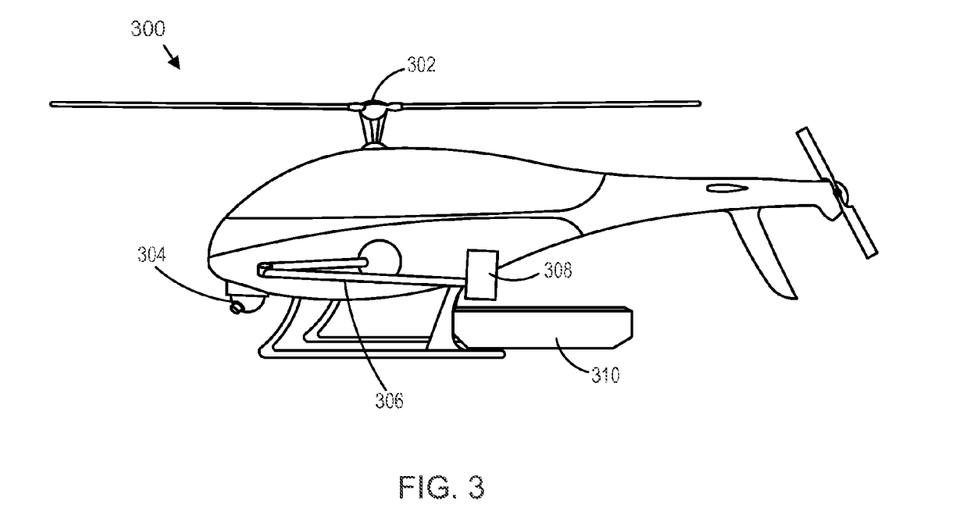
FIG. 3 is a side view of a service UAV, consistent with embodiments disclosed herein.

FIG. 3 illustrates a side view of a service UAV 300, according to one embodiment. The service UAV 300 is a helicopter-style UAV with a single lift rotor 302. In other, unillustrated embodiments, the service UAV may have multiple lift rotors (e.g., may be a quadropter), may be a fixed wing aircraft, or may use other types of flight propulsion or lift systems. The service UAV 300 includes an imaging system 304. For example, the imaging system 304 may include a gimbaled camera. The service UAV 300 may also include one or more of a radar system, a laser detection and ranging (LIDAR) system, lights for illuminating an area, and other sensors or devices to facilitate surveillance. The service UAV 300 includes a robotic arm 306, which may be used to manipulate or interact with a disabled UAV or a payload of the disabled UAV. The robotic arm 306 may include an end portion 308 that includes a claw, scoop, or other component to be used for interacting with a disabled UAV or other objects.

The service UAV 300 also includes a basket 310, which may operate as a payload compartment to hold or carry various components. For example, the basket 310 may be used to carry replacement fuel, batteries, or parts. Similarly, the basket 310 may be used to hold a disabled UAV or a recovered portion of the disabled UAV. In one embodiment, a payload compartment may be located within a body of the service UAV 300. In one embodiment, the service UAV 300 may have a larger size or greater range, greater payload carrying capacity, or the like, than the one or more UAVs it is designed to assist. The service UAV 300 may be powered by electricity, by a liquid or gaseous fuel, or by any other energy source.

Figure 4:
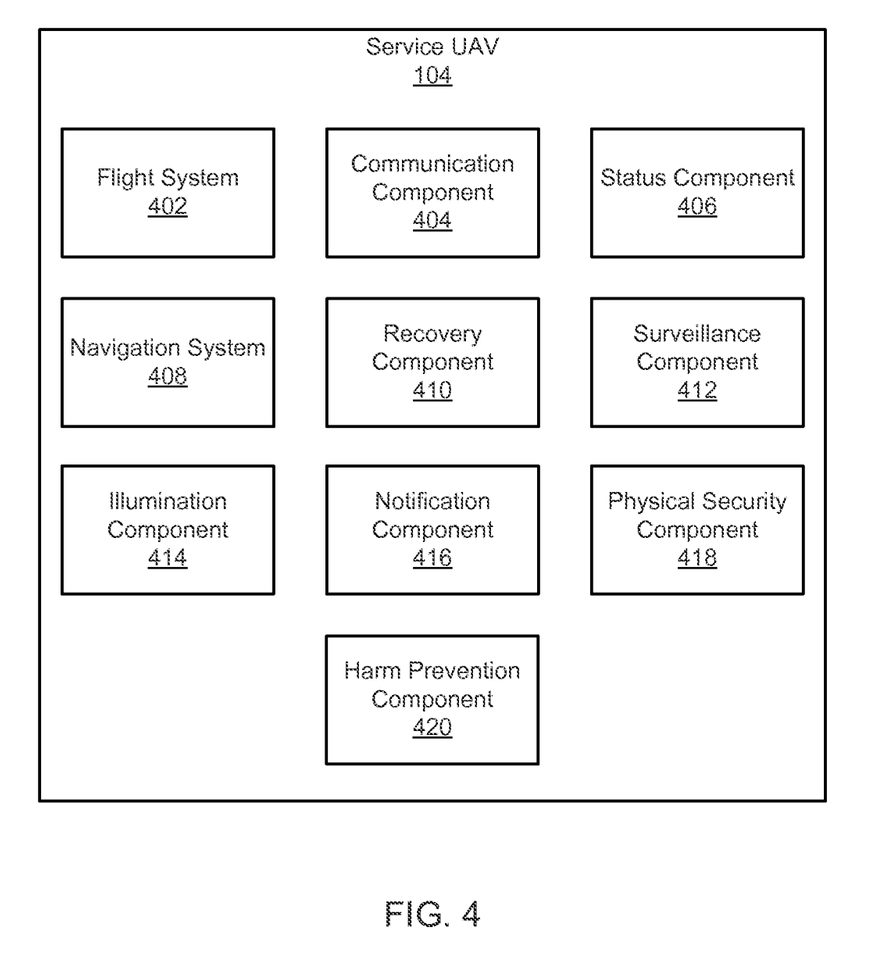
FIG. 4 is a schematic block diagram of a service UAV, consistent with embodiments disclosed herein.

FIG. 4 is a block diagram of service UAV 104, according to one embodiment. The service UAV 104 includes a flight system 402, a communication component 404, a status component 406, a navigation system 408, and a recovery component 410. The components 402-410 are given by way of example only. Some embodiments may include only one or any combination of two or more of the components 402-410, without limitation.

The flight system 402 includes one or more physical structures, components, and control circuitry to cause and enable the service UAV 104 to fly. For example, the flight system 402 may include one or more motors or engines to induce movement of the service UAV 104, one or more propellers actuated by the motors or engines, and/or one or more wings, air foils, or other structures to provide lift for the service UAV 104. For example, the service UAV 300 of FIG. 3 may include a motor or engine to provide a rotational force to the rotor 302 to induce flight of the UAV 300. A flight system 402 for UAV airplanes, helicopters, jets, or any other type of aerial vehicle may be used.

The communication component 404 allows the service UAV 104 to communicate wirelessly with other devices or systems, such as the UAV assistance system 102 and disabled UAVs. In one embodiment, the communication component 404 includes one or more wireless radios. For example, the communication component 404 may include one radio configured to communicate with a cellular network on a wireless spectrum and another radio configured to communicate with disabled UAVs using an unlicensed or licensed spectrum. In one embodiment, the communication component 404 is configured to relay wireless communication signals between the disabled UAV and a remote entity, such as the UAV assistance system 102, the third party system 108, or another system. For example, this may allow the service UAV 104 to assist a disabled UAV in communicating with other devices if a communication system of the disabled UAV has been damaged or lost power such that it can only communicate over short ranges.

In one embodiment, the communication component 404 may receive, process, or decode a message dispatching the service UAV 104 to provide assistance to a disabled UAV. In one embodiment, the communication component 404 may receive or process a transmission indicating a status of the disabled UAV. For example, the status may indicate one or more failures or statuses of systems of the disabled UAV. In one embodiment, the communication component 404 may receive a wireless transmission indicating that the service UAV 404 should not fly to the landing location of the first UAV. For example, the transmission may be sent by the disabled UAV, by the disabled UAV's owner or operator, by the disabled UAV's base, by the service UAV 104's base, from the UAV assistance system 102, and/or from a different service UAV.

In one embodiment, the communication component 404 may transmit information about what the service UAV 104 is doing. For example, the communication component 404 may indicate that the service UAV 104 is en route to a disabled UAV and may include an estimated time of arrival. The arrival time or other information may be sent to the UAV assistance system 102, to the disabled UAV, and/or to an owner or operator of the disabled UAV. In one embodiment, an indication that the service UAV 104 will fly to the landing location of the disabled UAV may be sent to other service UAVs, effectively calling them off.

The status component 406 is configured to determine a status of a UAV. For example, the status component 406 may determine whether a specific UAV is disabled or otherwise in need of assistance. In one embodiment, the status component 406 may determine a status of a UAV based on observing the UAV using one or more sensors. For example, the status component 406 may determine that a UAV is disabled, broken, crashed, or otherwise disabled based on directly observing the UAV using one or more imaging devices or sensors. For example, the status component 406 may determine that a UAV is disabled based on imaging the UAV with a camera. In one embodiment, the service UAV 104 may determine the status of the UAV based on a direct transmission from the first UAV. For example, a UAV may send out a signal indicating that it is disabled and the service UAV 104 may receive the signal. In one embodiment, the status component 406 may determine a disabled status of a UAV based on a message received from a UAV assistance system 102, third party system 108, or other service UAV. In one embodiment, wireless communications may be received from a base station 112 of a wireless network, such as a node of a cellular communications network.

In one embodiment, the disabled status determined by the status component 406 may include the portion of a UAV that is disabled or the type of assistance needed by the UAV. For example, the status component 206 may receive a message from a UAV assistance system 102, third party system 108, or other service UAV that indicates what assistance is needed or what portion of the UAV is disabled. In one embodiment, the disabled status may indicate that an energy storage component of the disabled UAV is low on fuel or power. In one embodiment, the disabled status may indicate one or more damaged components of the disabled UAV.

In one embodiment, the status component 406 may determine a landing location of a disabled UAV. For example, the status component 406 may determine a predicted or actual location of the UAV as determined based on direct sensor information or a signal received from the disabled UAV. As another example, the service UAV 104 may receive a message indicating the location of the disabled UAV from a UAV assistance system 102.

The navigation system 408 is configured to fly the service UAV 104. For example, the navigation system 408 may control a flight system 402 to cause the service UAV 104 to fly specific routes to desired locations, land the service UAV 104, or otherwise control a position of the service UAV 104. In one embodiment, the navigation system 408 includes a positioning system to determine a location of the service UAV 104. The positioning system may include a satellite navigation system, such as a global positioning system (GPS), or other positioning system.

In one embodiment, the navigation system 408 is configured to fly the service UAV 104 to a landing location of the disabled UAV in response to the status component 406 determining that the UAV is disabled. For example, the navigation system 408 may cause the service UAV 104 to fly to a location near the disabled UAV and/or land near the disabled UAV to provide assistance. In one embodiment, the navigation system 408 may cause the service UAV 104 to fly to a location indicated in a message received from a UAV assistance system 102, third party system 108, the disabled UAV, or another service UAV. In one embodiment, the navigation system 408 is configured to begin flying toward the disabled UAV based on a predicted landing location indicated in a first message, and to proceed to the landing location in response to a second message indicating an estimated or actual landing location. In one embodiment, the navigation system 408 estimates a time of arrival of the service UAV 104 at the landing site of the disabled UAV.

In one embodiment, the navigation system 408 determines a coverage area, such as a geographical coverage area, that is assigned to the service UAV 104. For example, a plurality of service UAVs 104 may have an assigned geographical area to ensure that proper coverage is maintained, and/or that the service UAVs 104 can provide assistance in a timely manner. In one embodiment, the navigation system 408 is configured to position the service UAV 104 within or near the coverage area by flying the service UAV 104 above the coverage area. In one embodiment, the navigation system 408 is configured to position the service UAV 104 within or near the coverage area by landing the service UAV 104 in or near the coverage area. In one embodiment, the navigation system 408 is configured to position the service UAV 104 within or near the coverage area in advance so that it is ready or available for a quick response to a disabled UAV when the status component 406 determines that a UAV is disabled. In one embodiment, the service UAV 104 may only assist disabled UAVs that land or have passed through a corresponding coverage area. In one embodiment, the service UAV 104 may respond to any request by a UAV assistance system 102, even if the UAV assistance system 102 indicates that assistance is needed in a region outside the coverage area.

The recovery component 410 is configured to provide assistance to a disabled UAV by recovering a disabled UAV, a portion of a disabled UAV, or a payload of a disabled UAV. For example, a UAV may carry valuable payloads that could be stolen, damaged, looted, or lost. As another example, knowledge about the UAV, including its operation, programming, or other aspects, may be important to competitors or others who wish to use, copy, or disrupt UAVs of a specific entity. In one embodiment, the recovery component 410 may be configured and sized to carry the disabled UAV, with or without payload. For example, the service UAV 104 may be larger than the disabled UAV and may be able to carry the disabled UAV inside or on a cable. In one embodiment, the recovery component 410 is configured to remove a portion of the disabled UAV or a payload from the disabled UAV. For example, the recovery component 410 may cause the service UAV 104 to remove a portion of the disabled UAV comprising control circuitry, a computer readable storage media, avionics, or another portion of the disabled UAV. In one embodiment, the service UAV 104 may grab a package from (or sample acquired by) the disabled UAV and deliver it to a delivery destination or other destination for safekeeping.

In one embodiment, the recovery component 410 may include one or more of a control element, an actuator, an arm, a claw, a scoop, a hook, a pulley, and a cable to change the position of or interact with the disabled UAV, a payload of the disabled UAV, or a portion of the disabled UAV. For example, robotic arm 306, end portion 308, and/or basket 310 of FIG. 3 may be part of or controlled by the recovery component 410. In one embodiment, the recovery component 410 may include one or more specialized tools for unscrewing screws, sawing parts, or otherwise removing portions or a payload of a specific type of UAV.

In one embodiment, the recovery component 410 recovers items by obtaining physical control over them. For example, the recovery component 410 may cause the service UAV 104 to bring a recovered part or UAV to a location or entity authorized by an owner of the disabled UAV. For example, the service UAV 104 may carry the recovered parts or UAVs to a warehouse or base of a disabled UAV. In one embodiment, the recovery component 410 causes the UAV 104 to take recovered portions to a safe location where damage or access is less likely to occur. For example, the recovered payloads, parts, or UAVs may be moved out of a roadway, away from areas where there are more people, or the like. As another example, the service UAV 104 may carry the UAV parts or payloads to a location easily recovered by land vehicles or authorized personnel. For example, the service UAV 104 may move the UAV parts or payload near a road or to a concealed area near a road where those with knowledge of the location can easily access the items.

In one embodiment, the recovery component 410 is configured to replenish a fuel source for a UAV. For example, if a UAV is disabled due to lack of energy or fuel, the service UAV 104 may bring fuel or energy to the disabled UAV. For example, the recovery component 410 may provide an electrical current to charge a battery or provide a liquid or gaseous fuel to fill up a fuel tank. In one embodiment, the recovery component 410 may remove a depleted battery or fuel tank and replace it with a full or replenished battery or fuel tank. For example, the recovery component 410 may be configured to remove an energy storage component (such as a battery or fuel tank) and then mount a replenished energy storage component. In one embodiment, the recovery component 410 may swap out the energy storage component so that the service UAV 104 carries away the depleted energy storage component and the previously disabled UAV is then able to operate and fly using the replenished energy storage component. In one embodiment, the service UAV 104 includes a payload area where one or more replenished energy storage components may be carried.

A surveillance component 412 is configured to provide and/or cause the service UAV 104 to provide surveillance of a downed or disabled UAV. For example, the service UAV 104 may guard a downed UAV. The service UAV 104 may hover overhead (or within sight) of the disabled UAV and maintain surveillance. The service UAV 104 may provide images of the downed UAV to inform one or more other units or entities of the safety or status of the disabled UAV. In one embodiment, the surveillance component 412 provides images, sound, location, or other information to ground-based units (e.g., police, fire, drone repair/retrieval). The service UAV 104 may report and follow looters of the disabled UAV or its payload.

In one embodiment, the surveillance component 412 may be configured to observe the disabled UAV and/or an area surrounding the disabled UAV. For example, the surveillance component 412 may include a camera, radar system, light detection and ranging (LIDAR) system, or the like to observe the disabled UAV and surrounding area. The data or images gathered by these systems may be stored or transmitted to other units or to a remote server, such as the UAV assistance system 102.

In one embodiment, the surveillance component 412 may cause the service UAV 104 to remain in an area where the surveillance component 412 can obtain images of or otherwise observe the disabled UAV. In one embodiment, the surveillance component 412 is configured to instruct the navigation system 408 to land the service UAV 104 at a location, allowing the surveillance component 412 to observe the first UAV. For example, the service UAV 104 may land near the disabled UAV where a camera, radar system, LIDAR system, or the like has an unobstructed view of the disabled UAV. In one embodiment, the service UAV 104 may land at a distance where looters might have a difficult time accessing the service UAV 104, such as on a nearby hilltop, building, billboard, or other location. In one embodiment, the surveillance component 412 is configured to instruct the navigation system 408 to maintain flight above the disabled UAV at a distance that allows the surveillance component 412 to observe the first UAV. For example, the service UAV 104 may hover or circle above the disabled UAV to maintain constant or almost constant surveillance of the disabled UAV.

In one embodiment, the surveillance component 412 is configured to observe or provide surveillance of the disabled UAV until surveillance by the service UAV 104 is no longer needed. For example, the service UAV 104 may observe the disabled UAV and the area surrounding the disabled UAV until arrival of an authorized entity to recover or observe the disabled UAV and the area surrounding the disabled UAV. The authorized entity may include a ground-based recovery unit of an owner, a government agency, a contracted recovery unit, or the like. The recovery unit may include another automated unit (such as a UAV or an unmanned ground or water vehicle).

In one embodiment, the surveillance component 412 is configured to determine that observation no longer needs to be performed by the service UAV 104 and may instruct the navigation system 408 to keep the service UAV 104 to remain within a location that allows the surveillance component to substantially and continually observe the first UAV and an area surrounding the first UAV. In one embodiment, the surveillance component 412 is configured to determine that observation no longer needs to be performed by the service UAV based on a received wireless transmission, such as from the disabled UAV, a UAV assistance system 102, a ground-based unit, another service UAV, or some other device or system that is authorized to call on the service UAV 104. In one embodiment, the surveillance component 412 is configured to determine that observation no longer needs to be performed by the service UAV 104 based on determining that the first UAV has been recovered by an authorized entity. In one embodiment, the surveillance component 412 is configured to determine that observation no longer needs to be performed by the service UAV 104 based on determining that the previously disabled or downed UAV is no longer disabled. In one embodiment, the surveillance component 412 is configured to determine that observation no longer needs to be performed by the service UAV 104 based on determining that a replacement service UAV has arrived to observe or assist the disabled UAV.

In one embodiment, the surveillance component 412 is further configured to observe a disabled status of the disabled UAV and to report the disabled status to a remote entity, such as the UAV assistance system 102, third party system 108, another service UAV, ground-based units, or the like. For example, the surveillance component 412 may gather information about what is wrong with the disabled UAV or its payload. For example, the surveillance component 412 may obtain up-close pictures of the disabled UAV so that a broken propeller, rotor, wing, or the like can be identified. Similarly damage to a box, payload, or other cargo may also be observed. In one embodiment, erratic behavior of the disabled UAV may be recorded on video and forwarded on. In one embodiment, the surveillance component 412 may receive signals from the disabled UAV and forward them on. For example, if the disabled UAV has a damaged radio or does not have enough power to transmit long distances, the surveillance component 412 may receive signals about what is wrong with the disabled UAV and forward them on. This information may be reported to an owner or operator of the disabled UAV or to nearby ground units.

In one embodiment, the surveillance component 412 forwards data, images, or other information to another device, system, or location. This may allow remotely located entities or personnel to monitor a status of the disabled UAV. In one embodiment, the surveillance component 412 is further configured to provide surveillance information to one or more ground-based units. For example, the surveillance component 412 may provide the information by acquiring data, formatting messages, and providing instructions to a radio of the service UAV 104 to send the messages or information. The surveillance information may include images, video, LIDAR data, radar data, messages received from the disabled UAV, or other data captured by the service UAV 104. In one embodiment, the service UAV 104 may send the information to one or more ground-based units such as a ground-based recovery unit or a first responder unit which may include police, fire, or medical units.

In one embodiment, the surveillance component 412 is configured to observe, detect, and/or identify a non-authorized entity in the area surrounding the disabled UAV. For example, if a person, UAV, or other entity comes near the disabled UAV, the surveillance component 412 may detect and report this event. In one embodiment, the surveillance component 412 is configured to determine that the non-authorized entity came within a predetermined distance of the first UAV. In one embodiment, the surveillance component 412 may obtain images, video, or other data about the non-authorized entity. In one embodiment, the surveillance component 412 will instruct the navigation component 408 to move or fly the service UAV 104 closer to obtain higher quality images or data. In one embodiment, surveillance component 412 will cause the navigation system 408 to fly the service UAV 104 to follow the non-authorized entity.

The illumination component 414 is configured to provide illumination for one or more sensors used to observe or provide surveillance of a disabled UAV. For example, the illumination component may illuminate at least one of the disabled UAV and the area surrounding the disabled UAV. The illumination component 414 may include a source of visible light, infrared light, or electromagnetic wavelengths that are detected by a sensor of the surveillance component. The illumination component 414 may include a spotlight or other light that may be used to see objects more clearly at night.

The notification component 416 provides an indication to notify nearby individuals, UAVs, or other entities that the service UAV 104 is observing the disabled UAV. For example, the notification component 416 may provide a visual, audible, or radio notification so that nearby people or devices can recognize the presence of the service UAV 104.

For example, the notification may be used to provide notice of a hazard or danger, or the absence of a hazard or danger, posed by the disabled UAV. In one embodiment, the notification component 416 causes one or more lights on the service UAV 104 to flash to draw attention to its presence. In one embodiment, the notification component 416 includes a speaker to generate audible sounds. In one embodiment, the notification component 416 is configured to provide an audible sound, such as a siren or voice warning, that the service UAV 104 is observing the disabled UAV or to provide information of potential danger which may result from the disabled UAV.

The physical security component 418 is configured to provide physical security for the disabled UAV. For example, the physical security component 418 may cause the service UAV 104 to land nearby and provide physical security. Individuals or entities may see the service UAV 104 and may be able to avoid the disabled UAV (e.g., while driving) or may know that they cannot get away with taking the disabled UAV or a payload. In one embodiment, the physical security component 418 is configured to inhibit unauthorized entities from approaching the disabled UAV. In one embodiment, the physical security component 418 is configured to play an audible sound to provide auditory notice or to induce unauthorized entities to stay away from the first UAV.

In one embodiment, the physical security component 418 may mark a safe perimeter. For example, the physical security component 418 may use or include an arm, claw, or releasable hook or door to drop markers or place warning signs. As another example, a spray paint mechanism on an end of an arm may be used to mark a perimeter using paint.

The harm prevention component 420 is configured to place the disabled UAV in a safe, or damage prevention, state to limit damage to nearby property, a payload of the disabled UAV, or damage to the disabled UAV. For example, the harm prevention component 420 may "safe" the downed UAV by removing fuel, discharging batteries, sterilizing the disabled UAV, or the like. As another example, the harm prevention component 420 is configured to place the first UAV in a damage prevention condition to prevent heat or fire damage to one or more of the disabled UAV and objects in an area near the disabled UAV. In one embodiment, the service UAV 104 may put out a fire on or near the downed UAV, spray the downed UAV with fire preventive, or the like to prevent a fire. In one embodiment, the harm prevention component 420 includes a spray mechanism that can be used to spray fire preventative or disinfectant. In one embodiment, the harm prevention component 420 moves the disabled UAV, a payload, or a portion of a disabled UAV to a different location to prevent further or likely damage. For example, if the disabled UAV has crashed or landed on a roadway, the service UAV 420 may move the disabled UAV off the road to prevent accidents, damage, or other problems that may otherwise result.

In one embodiment, the harm prevention component 420 is configured to discharge or empty an energy storage component. For example, the energy storage component may include a battery and the harm prevention component 420 may discharge the battery using a conductor, a resistor, and a robotic arm of the service UAV 104. The arm may be used to plug in or apply a conductive circuit to a terminal of the battery or circuit connected to the battery to discharge electrical energy quickly and safely from the battery. In one embodiment, the energy storage component may include a liquid or gaseous fuel tank and the harm prevention component 420 may siphon or otherwise remove the fuel from the fuel tank. Removal of fuel or discharging of energy may lead to a reduced risk of heat generation, fire, and/or explosion. In one embodiment, the harm prevention component 420 may cause the service UAV 104 to remove a battery or fuel tank to be recovered or moved to a safe location or distance. In one embodiment, the harm prevention component 420 may remove any combustible or flammable component of the disabled UAV. For example, a portion of the disabled UAV may be flammable or otherwise likely to burn or generate heat. The harm prevention component 420 may remove the flammable or other portion that is likely to burn or generate heat to reduce risk of causing a fire, explosion, or other heat damage.

In one embodiment, the harm prevention component 420 is configured to identify one or more hot areas of the disabled UAV or in an area near the UAV. For example, the harm prevention component 420 may use an infrared camera, a non-contact thermometer, or the like to identify hot areas. In one embodiment, the harm prevention component 420 applies a fire preventative, removes a heat generating component, or removes a combustible portion from the disabled UAV to limit further buildup of heat, cool the hot area, or prevent a fire. In one embodiment, the harm prevention component 420 sprays a fire preventative on the disabled UAV, or on a region near the disabled UAV, to prevent or stop a fire. In one embodiment, the harm prevention component 420 sprays a disinfectant or otherwise applies a substance to sterilize the disabled UAV. For example, the disabled UAV may have been exposed to non-sanitary conditions during flight, landing, or impact.

In one embodiment, the harm prevention component 420 may report a hazard status of the disabled UAV. For example, if the harm prevention component 420 detects a fire or hot spot on or near the disabled UAV, the harm prevention component 420 may report this information to the UAV assistance system 102 or any other entity discussed herein. This may allow a quick response to prevent or limit damage that may otherwise result from a fire or heat damage. In one embodiment, the harm prevention component 420 reports what actions or countermeasures the service UAV 104 has performed to prevent further damage. For example, harm prevention component 420 may generate or format a message reporting one or more actions of the harm prevention component 420 to be wirelessly transmitted by the service UAV 104.

Figure 5:
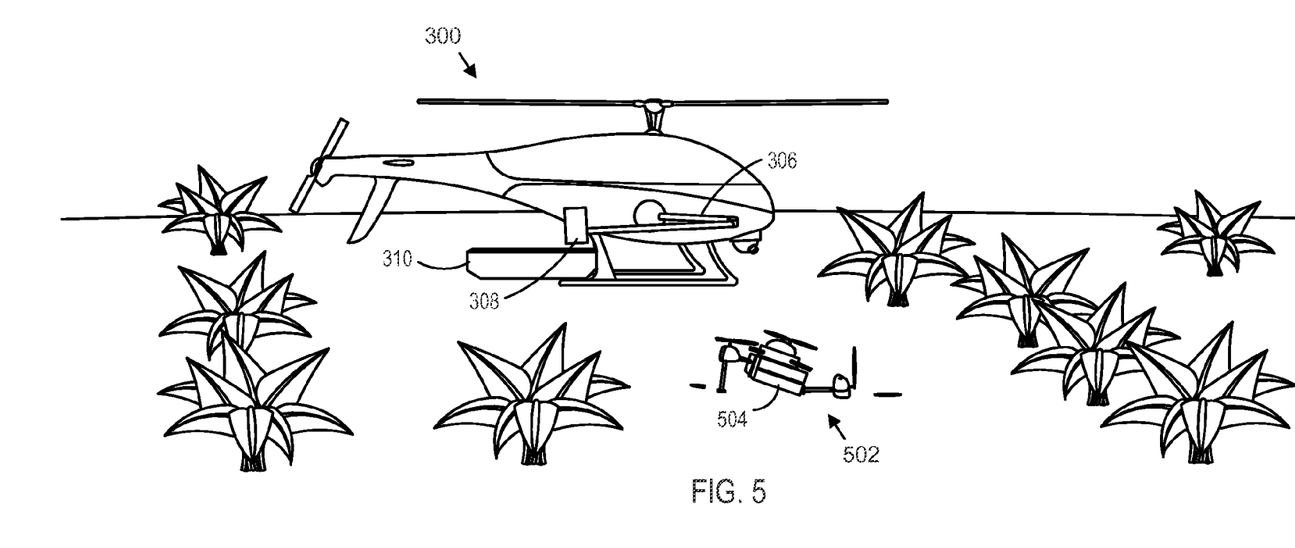
FIG. 5 is a perspective view of a service UAV landing near a disabled UAV, consistent with embodiments disclosed herein.

FIG. 5 is a perspective view illustrating a service UAV 300 that has landed near a disabled UAV 502 to provide assistance. The disabled UAV 502 is shown with a payload 504. For example, the disabled UAV 502 may have been tasked with delivering the payload to a customer or a delivery location. In one embodiment, the service UAV 300 may use the arm 306 and a claw, hook, or tool on the end portion 308 to manipulate the disabled UAV 502 or a portion of the disabled UAV 502. For example, the service UAV 300 may use the arm 306 to hook onto or grab the disabled UAV 502 and carry it to a safe location. In one embodiment, the service UAV 300 may pick up the disabled UAV 502, one or more parts of the disabled UAV 502, and/or a payload 504 for recovery. In one embodiment, the disabled UAV 502, one or more parts of the disabled UAV 502, and/or the payload 504 may be placed within the basket 310 for transportation. In one embodiment, the service UAV 300 may spray the disabled UAV with fire preventative, spray with disinfectant, and/or determine a temperature. The service UAV 300 may also protect the disabled UAV 502 from intruders, provide warning notifications, and/or provide any other assistance disclosed herein.

Figure 6:
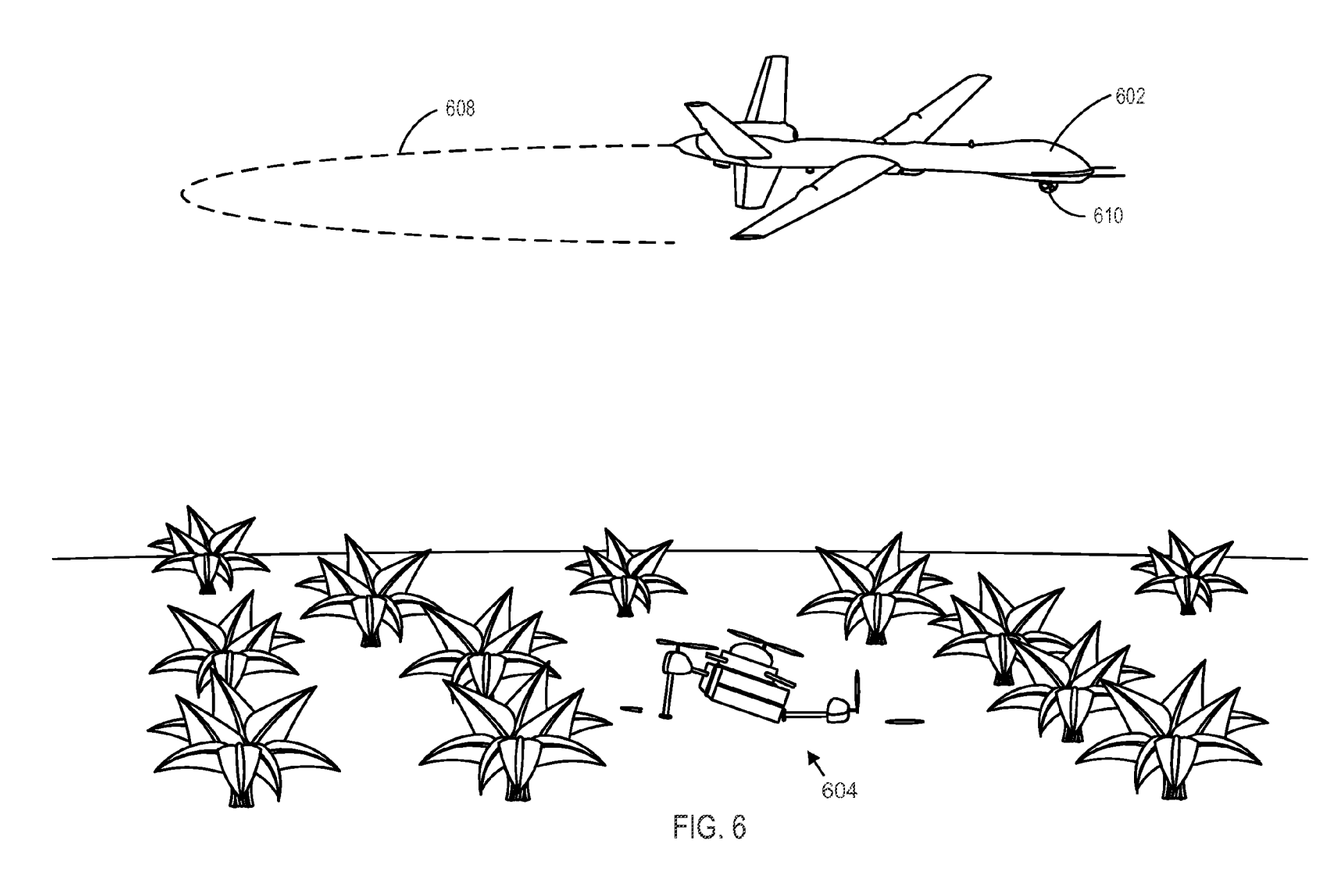
FIG. 6 is a perspective view of a service UAV flying above a disabled UAV, consistent with embodiments disclosed herein.

FIG. 6 is a perspective view illustrating an airplane style service UAV 602 flying above a disabled UAV 604. The service UAV 602 is flying in a path 608 above the disabled UAV 604 to maintain surveillance over the disabled UAV 604. The path 608 may be a circular or other shaped path to stay within a maximum distance of the disabled UAV 604. A sensor unit 610 may hold a camera, radar unit, LIDAR unit, or other sensing system to observe or obtain data about the disabled UAV 604 and a surrounding area. For example, the service UAV 602 may provide surveillance of the disabled UAV 604 until an authorized entity arrives or the disabled UAV 604 is recovered. The service UAV 602 may also provide status reporting for the disabled UAV 604, forward wireless communications, or provide any other assistance discussed herein.

Figure 7:
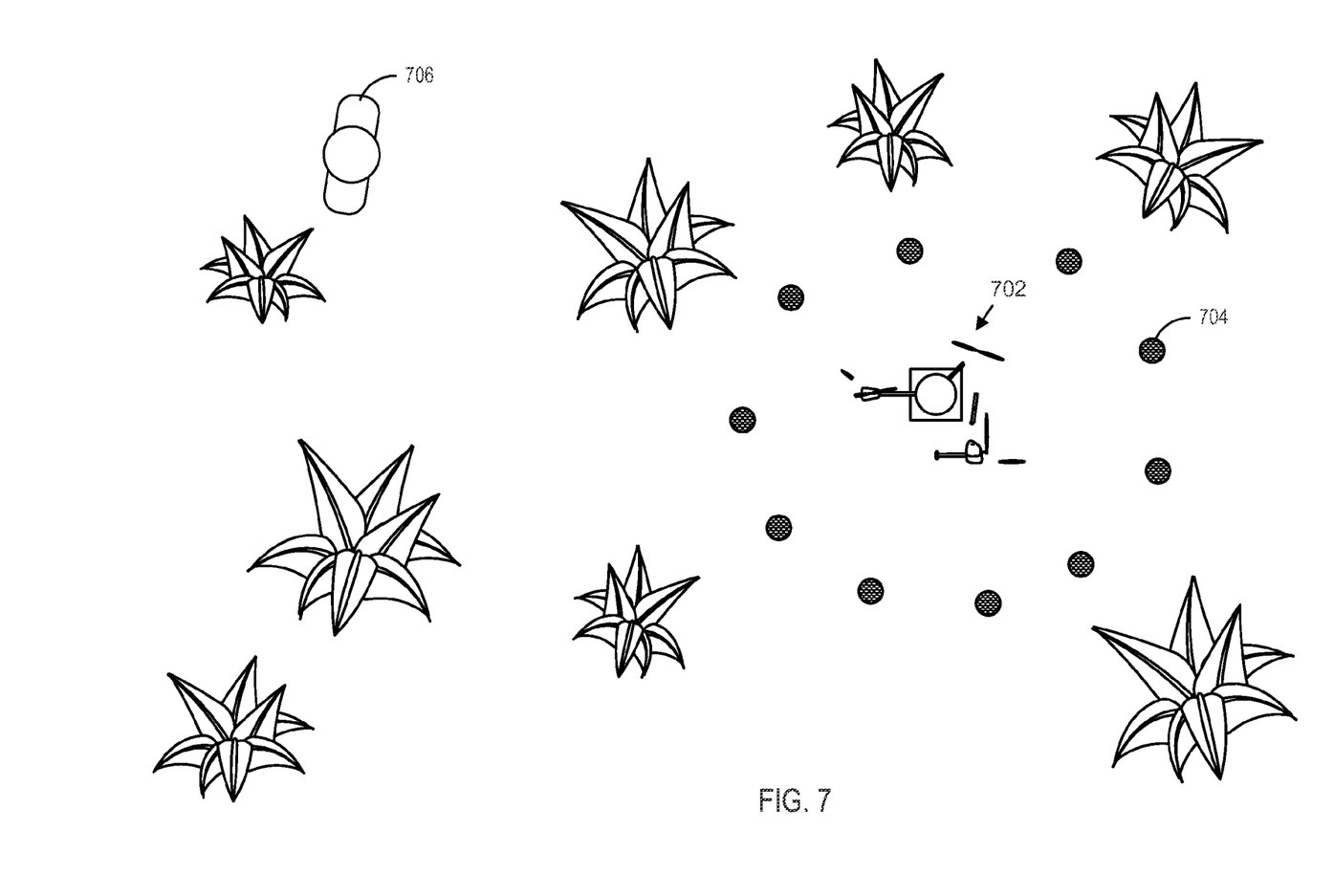
FIG. 7 is a top view of a landing area of a service UAV, consistent with embodiments disclosed herein.
Figure 8:
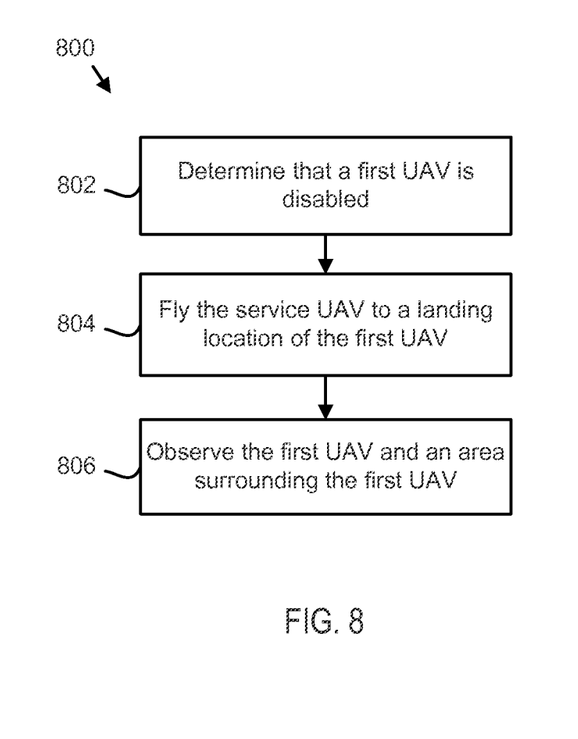
FIG. 8 is a schematic flow chart diagram illustrating a method for assisting a disabled UAV, consistent with embodiments disclosed herein.

FIG. 7 is top view of a region surrounding a landing or crash location of a disabled UAV 702. The view illustrates one embodiment of a camera view of a service UAV that has come to provide assistance to the disabled UAV 702. The disabled UAV 702 is surrounded by markers 704 that mark a perimeter around the disabled UAV 702. In one embodiment, the markers 704 were dropped by a service UAV that has come to provide surveillance, recovery, or other assistance to the disabled UAV 702. A person 706 is shown near the disabled UAV 702. In one embodiment, a service UAV may provide surveillance of the disabled UAV 702 and the person 706 to track or inhibit the person 706 from touching, damaging, or taking the disabled UAV 702, a portion of the disabled UAV 702, or a payload. In one embodiment, a service UAV provides an audible or visual warning to the person 706 to stay away from the disabled UAV 702. The service UAV may move or fly to a different location to obtain identifying images of the person 706 in case the person comes too close to the disabled UAV 702. In one embodiment, the service UAV may follow the person 706 if the person 706 comes within a perimeter defined by the markers 704. A service UAV may provide any of the services discussed herein. FIG. 8 is a schematic flow chart diagram illustrating a method 800 for assisting a disabled UAV. The method 800 may be performed by another UAV, such as the service UAV 300 of FIG. 3 or the service UAV 104 of FIG. 4.

The method 800 begins and a status component 406 determines 802 that a first UAV is disabled. For example, the status component 406 may determine 802 that the first UAV is disabled based on imaging data obtained by a camera and/or based on a message received from the disabled UAV, another service UAV, a UAV assistance system 102, or a third party system 108. The status component 406 may also determine a location of the first UAV or type of assistance needed by the first UAV.

A navigation system 408 flies 804 the service UAV to a landing location of the first UAV. For example, the navigation system 408 may fly 804 to the landing location in response to the status component 406 determining 802 that the first UAV is disabled.

A surveillance component 412 observes 806 the first UAV and an area surrounding the first UAV. The surveillance component 412 may cause the service UAV to land or fly along a path that allows a camera or other sensor device to substantially and constantly observe the first UAV. In one embodiment, data acquired during surveillance may be forwarded to one or more other systems, such as the UAV assistance system 102, third party system 108, a ground-based unit, or other device or system.

Figure 9:
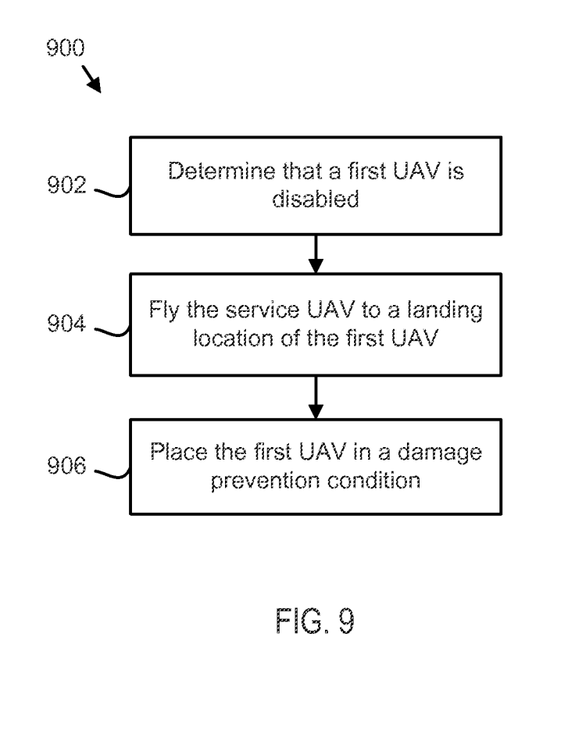
FIG. 9 is a schematic flow chart diagram illustrating another method for assisting a disabled UAV, consistent with embodiments disclosed herein.

FIG. 9 is a schematic flow chart diagram illustrating a method 900 for assisting a disabled UAV. The method 900 may be performed by another UAV, such as the service UAV 300 of FIG. 3 or the service UAV 104 of FIG. 4.

The method 900 begins and a status component 406 determines 902 that a first UAV is disabled. For example, the status component 406 may determine 902 that the first UAV is disabled based on imaging data obtained by a camera and/or based on a message received from the disabled UAV, another service UAV, a UAV assistance system 102, or a third party system 108. The status component 406 may also determine a location of the first UAV or type of assistance needed by the first UAV.

A navigation system 408 flies 904 the service UAV to a landing location of the first UAV. For example, the navigation system 408 may fly 904 to the landing location in response to the status component 406 determining 902 that the first UAV is disabled.

A harm prevention component 420 places 906 the first UAV in a damage prevention condition. In one embodiment, the harm prevention component 420 places 906 the first UAV in a damage prevention condition to prevent heat or fire damage to one or more of the first UAV and objects in an area near the first UAV. For example, the harm prevention component 420 may identify one or more hot spots by detecting a temperature, by identifying smoke or flame, or by some other method and spray the hot spots with fire preventative. In one embodiment, the harm prevention component 420 may place 906 the first UAV in a damage prevention condition by spraying it with a sanitizer or by moving it to an area where damage is less likely to occur to the first UAV, a payload of the first UAV, or an area surrounding the first UAV.

The terms "component" and "system" are used herein to indicate the implementation independence of various aspects of the disclosed embodiments. Components or systems may include one or more of processing logic, programmable logic, hardware circuitry, computer systems, computer readable media, actuators, sensors, or the like. Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer readable medium having stored thereon instructions that may be used to program a computer system or other electronic device to perform the processes described herein. The computer readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. In relation to communication, the term "receive" is given to mean one or more of receipt of a signal at an antenna, modem, or interface; decoding or processing of the signal to decipher data encoded within the signal; and interpreting the received data to determine a meaning, instruction, or attribute encoded within the message.

One suitable network includes a server and several clients. Other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general-purpose computers, computer programming tools and techniques, computer networks and networking technologies, digital storage media, authentication, access control, and other security tools and techniques provided by public keys, encryption, firewalls, and/or other means.

A subsystem may include a processor, a software module stored in a memory and configured to operate on the processor, a communication interface, sensors, user interface components, and/or the like. The components in each subsystem may depend on the particular embodiment (e.g., whether the system directly measures data or acquires the data from a third party). It will be apparent to those of skill in the art how to configure the subsystems consistent with the embodiments disclosed herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A service unmanned aerial vehicle (UAV) comprising:
a flight system for flying the service UAV;
a status determination component for determining that a first UAV is disabled, wherein the first UAV is different than the service UAV;
a service UAV navigation system to navigate the service UAV to fly to a landing location of the first UAV in response to the status determination component determining that the first UAV is disabled; and
a surveillance component configured to observe the first UAV and an area surrounding the first UAV.

2. The service UAV of claim 1, wherein the service UAV further comprises an illumination component, and wherein the illumination component is configured to illuminate at least one of the first UAV and the area surrounding the first UAV.

3. The service UAV of claim 1, wherein the service UAV further comprises a communication component for sending and receiving wireless transmissions.

4. The service UAV of claim 3, wherein the communication component is further configured to relay wireless communication signals between the first UAV and a remote entity.

5. The service UAV of claim 1, further comprising a notification component configured to provide audible or visual notification that the service UAV is observing the first UAV and the area surrounding the first UAV to entities near the area surrounding the first UAV.

6. The service UAV of claim 1, wherein the surveillance component is configured to cause the navigation system to maintain flight above the first UAV at a distance that allows the surveillance component to observe the first UAV.

7. The service UAV of claim 1, wherein the surveillance component is configured to determine that observation no longer needs to be performed by the service UAV, and wherein the navigation system is configured to remain within a location that allows the surveillance component to substantially continually observe the first UAV and an area surrounding the first UAV.

8. The service UAV of claim 7, wherein the surveillance component is configured to determine that observation no longer needs to be performed by the service UAV based on a received wireless transmission.

9. The service UAV of claim 7, wherein the surveillance component is configured to determine that observation no longer needs to be performed by the service UAV based on determining that the first UAV has been recovered by an authorized entity.

10. The service UAV of claim 7, wherein the surveillance component is configured to determine that observation no longer needs to be performed by the service UAV based on determining that the first UAV is no longer disabled.

11. The service UAV of claim 7, wherein the surveillance component is configured to determine that observation no longer needs to be performed by the service UAV based on determining that a replacement service UAV has arrived to observe or assist the first UAV.

12. The service UAV of claim 1, wherein the surveillance component is further configured to observe a disabled status of the first UAV and to report the disabled status to a remote entity.

13. Computer readable storage media having collectively stored thereon executable instructions that, when executed by one or more processors, cause a service unmanned aerial vehicle (UAV) to:
  determine that a first, non-service UAV is disabled, wherein the first UAV is different than the service UAV;
  fly the service UAV to a landing location of the first UAV in response to the determination that the first UAV is disabled; and
  observe the first UAV.

14. The computer readable storage media of claim 13, wherein the executable instructions further cause the service UAV to provide surveillance information to one or more ground-based units.

15. The computer readable storage media of claim 14, wherein the surveillance information comprises images captured by the service UAV.

16. The computer readable storage media of claim 13, wherein the executable instructions further cause the service UAV to observe a non-authorized entity in the area surrounding the first UAV.

17. The computer readable storage media of claim 16, wherein the executable instructions further cause the service UAV to obtain images or video of the non-authorized entity.

18. The computer readable storage media of claim 16, wherein the executable instructions further cause the service UAV to fly and follow the non-authorized entity.

19. The computer readable storage media of claim 16, wherein the executable instructions further cause the service UAV to determine that the non-authorized entity came within a predetermined distance of the first UAV.

20. The computer readable storage media of claim 13, wherein the executable instructions further cause the service UAV to provide physical security to the first UAV.

21. The computer readable storage media of claim 20, wherein providing physical security comprises dropping objects to mark a perimeter around the first UAV.

22. The computer readable storage media of claim 20, wherein providing physical security comprises playing an audible sound to provide auditory notice or to induce unauthorized entities to stay away from the first UAV.

23. A service unmanned aerial vehicle (UAV) comprising:
  a flight system for flying the service UAV;
  a status component configured to determine that a first UAV is disabled, wherein the first UAV is different than the service UAV;
  a navigation system configured to cause the service UAV to fly to a location of the first UAV in response to the status component determining that the first UAV is disabled; and
  a harm prevention component configured to place the first UAV in a damage prevention condition to prevent at least one of heat damage and fire damage to one or more of the first UAV and objects in an area near the first UAV.

24. The service UAV of claim 23, further comprising a communication component configured to wirelessly transmit a signal reporting one or more actions of the harm prevention component.

25. The service UAV of claim 23, further comprising a notification component configured to wirelessly transmit a signal reporting a hazard status of the first UAV.

26. The service UAV of claim 23, further comprising a notification component configured to provide audible or visual notification to nearby personnel of a hazard status of the first UAV.

27. The service UAV of claim 23, wherein the harm prevention component is configured to discharge an electrical energy storage component.

28. The service UAV of claim 23, wherein the harm prevention component is configured to place the first UAV in the heat prevention condition by removing a liquid or gas fuel from the first UAV.

29. The service UAV of claim 23, wherein the harm prevention component is configured to place the first UAV in the heat prevention condition by applying a fire preventative to one or more of the first UAV and an area near the first UAV.

30. The service UAV of claim 23, wherein the harm prevention component is configured to put out a fire on one or more of the first UAV by spraying fire preventative on a fire or hot spot on one or more of the first UAV and a region surrounding the first UAV.

31. Computer readable storage media having collectively stored thereon executable instructions that, when executed by one or more processors, cause a service unmanned aerial vehicle (UAV) to:
- determine that a first UAV is disabled;
- fly to a landing location of the first UAV in response to determining that the first UAV is disabled; and
- place the first UAV in a damage prevention condition to prevent heat or fire damage to one or more of the first UAV and objects in an area near the first UAV.

32. The computer readable media of claim 31, wherein placing the first UAV in a damage prevention condition comprises removing a combustible or flammable component of the first UAV.

33. The computer readable media of claim 32, wherein the combustible or flammable component of the first UAV comprises an energy storage component.

34. The computer readable media of claim 31, wherein the executable instructions further cause the service UAV to sterilize the first UAV.

35. The computer readable media of claim 31, wherein the landing location of the first UAV is a crash landing location of the first UAV.

* * * * *